United States Patent Office 3,441,785 Patented Apr. 29, 1969

3,441,785

TELEVISION CAMERA DEVICES

James L. Levan, Elmira, and James F. Nicholson, Pine City, N.Y., assignors to Westinghouse Electric Corporation, Pittsburgh, Pa., a corporation of Pennsylvania Filed Oct. 5, 1964, Ser. No. 401,565
Int. Cl. H01j 31/48
U.S. Cl. 315—11 10 Claims

ABSTRACT OF THE DISCLOSURE

This invention relates to a television camera device illustratively including a photocathode element for emitting an electron image in response to an incident radiation image, an apertured member, an electron multiplier disposed remotely with respect to the photocathode element to receive electrons directed through the aperture of the member, and shielding means for allowing only those electrons which pass through the aperture to be directed upon the electron multiplier.

This invention relates to electron discharge devices, and more particularly to improvements in those television camera devices known as image dissectors.

One of the earliest electronic television camera devices was the so-called image dissector tube. In 1934, P. T. Farnsworth disclosed an image dissector having a photocathode element for converting a light image into an electron image which is repeatedly scanned across a plate having a collecting aperture therein. Aligned with the collecting aperture is a pick-up device such as a multi-stage electron mutiplier to increase the strength of the signal created by that portion of the electron image directed to the collecting aperture. Initially, the Farnsworth device never met with commercial success for several reasons. Primarily in this period, the photocathode elements and electron multipliers available were rather inefficient; as a result, the tube was found suitable only for outdoor televising or reproduction of motion pictures where the brightness of the objects to be viewed was quite high.

In recent years, a need has arisen for a very high resolution and narrow band transmission television camera device. In newly developed searching and tracking systems, a high intensity light source is used to scan a specified field of search, and a high resolution television camera device such as an image dissector is set to scan in synchronization with the high intensity light source to thereby receive the light reflected from an object in the desired field. Further, high resolution television camera devices have obvious application in the readout of information from condensed storage media such as microfilm, and also in the transmitting of detailed pictures of celestial objects taken in space.

The best television camera devices of the prior art have a resolution in the order of only 1000 television lines per inch. However, there has recently been developed an image dissector having a capability of resolving 3000 television lines per inch; this device has been disclosed in a copending application of James F. Nicholson, Ser. No. 383,316, now U.S. Patent No. 3,341,734, filed July 17, 1964, under the title, "Television Camera Devices and Related Systems," and assigned to the same assignee of this invention.

During the development of the image dissector disclosed in the above referred to application, there existed a problem in attempting to realize the full resolution of this device due to the presence of a considerable amount of noise or extraneous signal, which appeared as extraneous small white dots in the black portion of the monitored picture. When this problem was analyzed, it was determined that the electron image emitted by the photocathode element was being accelerated to a degree sufficient to pass the collecting aperture and was being attracted by the positive potentials applied to the elements of the electron multiplier, the anode element associated with the electron multiplier and the lead wires associated with these elements. These electrons are out of synchronism with those being directed to the collecting aperture and will appear in a monitoring display as noise or an extraneous signal.

It is accordingly an object of this invention to provide an improved television camera device.

It is another object of this invention to provide an improved television camera device wherein the level of noise or the presence extraneous signals have been substantially reduced.

It is a further object of this invention to provide an improved, high resolution image dissector wherein the level of noise or extraneous signal due to the presence of uncollected electrons is substantially reduced.

Briefly, the present invention accomplishes the above cited objects by providing an improved image dissector wherein a shielding means is disposed to prevent the high voltage existing within the electron multiplier section of an image dissector from attracting or diverting spurious electrons from the electron image emitted by the photocathode element. In one illustrative embodiment of this invention an annular shielding means was disposed between the photocathode element and the collecting aperture to prevent electrons from being directed into the electron multiplier section. Further, a second shielding means may be provided about the elements of the electron multiplier to provide an additional electron barrier.

Further objects and advantages of the invention will become apparent as the following description proceeds and features of novelty which characterize the invention will be pointed out in particularity in the claims annexed to and forming a part of this specification. For a better understanding of the invention, reference may be had to the accompanying drawings, in which:

Figure 1:
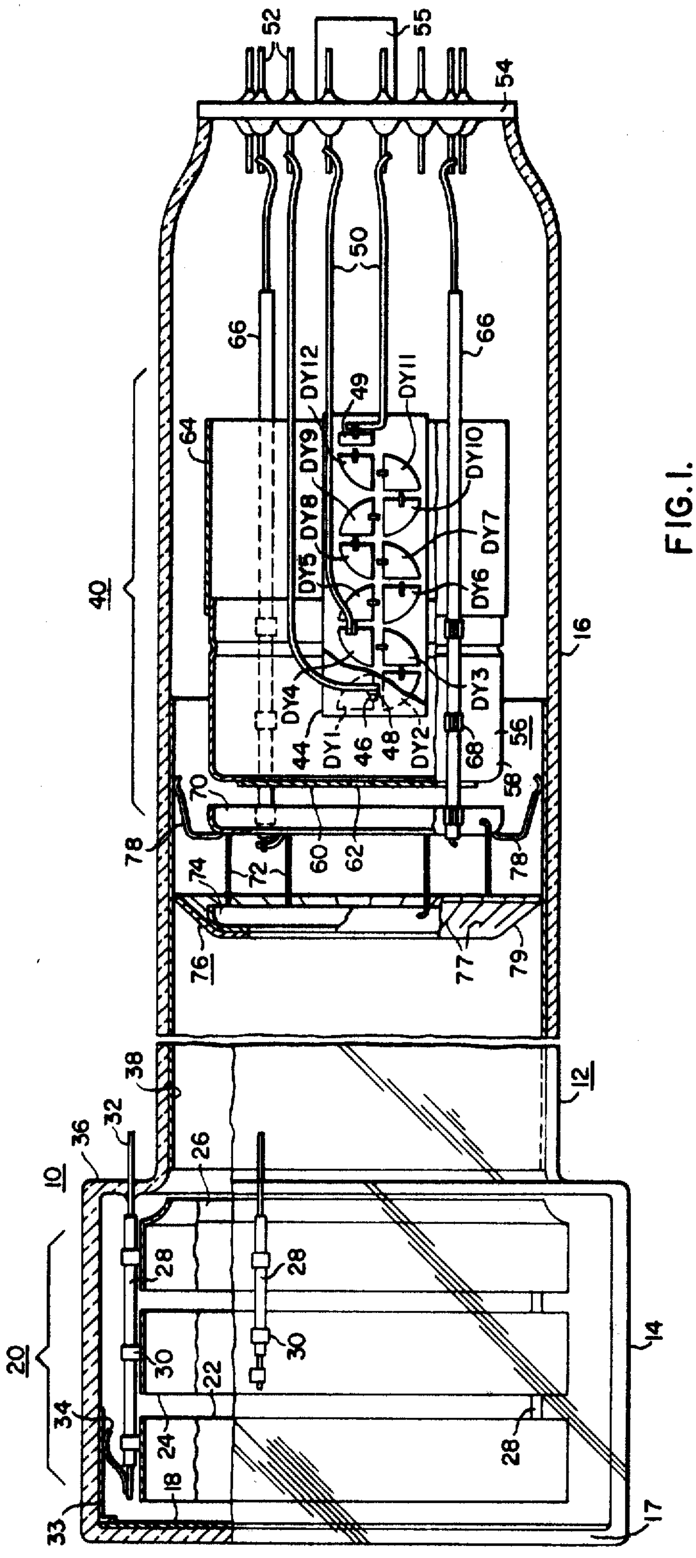
FIGURE 1 shows a partially sectioned view of an image dissector in which an embodiment of this invention may be incorporated.

Referring to the drawings and initially to FIG. 1, an image dissector 10 constructed in accordance with this invention comprises an evacuated envelope 12 having a cylindrical major portion 14 and a concentrically aligned, cylindrical minor portion 16. The major portion 14 of the envelope 12 is enclosed by a light transmissive face plate 17 upon which is deposited a photocathode element 18. In an exemplary embodiment of this invention, the photocathode element 18 was formed by first evaporating a layer of antimony upon the face plate 17 and then reacting this layer of antimony with alkali vapors.

An image section 20 is formed within the major portion 14 and comprises a G6 electrode 22, a target cup electrode 24 and a G5 electrode 26. These electrodes are formed of a cylindrical configuration and are aligned centrally of the envelope 12 in the order enumerated. The electrodes 22, 24 and 26 are mounted upon support rods 28 made of an insulating ceramic material such as alumina. The support rods 28 are connected to their respective electrodes by tabs 30 which may be welded to the surface of an electrode. The support rods 28 resemble the well known insulating spaghetti and connecting pins 32 may be inserted therethrough to provide electrical connections for the electrodes. The connecting pins 32 are further inserted through and are embedded in a shoulder portion 36 of the envelope 12, which is formed between the major portion 14 and the minor portion 16, to provide external terminals. An electrical connection is provided for the photocathode element 18 by a terminal foil 33 which has been formed over a portion of the photocathode element 18 and the inner surface of the envelope 12. Further, a resilient contact 34 is secured to one of th connecting pins 32 so as to resiliently abut against the terminal foil 33.

Within the minor portion 16 of the envelope 12 there is located a pickup or electron multiplier section 40 comprising a plurality of dynodes DY1 to DY12 (or more if desired). The plurality of 12 dynodes DY1 and DY12 are positioned within a G3 electrode 56 which comprises a cup member 58 and an aperture plate or surface 60 secured to an end of the cup member 58 and having a collecting aperture 62. The first dynode DY1 is aligned behind the collecting aperture 62 to receive those electrons directed through the collecting aperture 62. The remaining dynodes DY2 to DY12 are positioned in a serpentine pattern to receive the flow of electrons from the preceding dynode and to generate secondary electrons toward the next dynode to provide a 12-fold multiplication of electrons flowing through the collecting aperture 62. Though a particular embodiment of the electron multiplier has been shown in FIG. 1, other well known types of multipliers could be used. The dynodes DY1 to DY12 are mounted between two parallel disposed plates 44 which are made of an insulating material such as mica. Each of the dynodes is provided with two tabs 48 which are inserted into slots 46 of the insulating plates 44 and are twisted to thereby secure the dynodes to the insulating plates 44. There is positioned directly behind the last dynode DY12 a dynode anode 49 to receive the multiplied stream of electrons and to provide an output electrode for a signal corresponding to the image received on the photocathode element 18. Further, each of the dynodes DY1 to DY12 is attached to a connecting wire 50 (not all of the wires have been shown in FIG. 1) which are in turn connected to the terminal pins 52. The terminals pins 52 are embedded in an end plate 54 of the enevlope 12.

Figure 2:
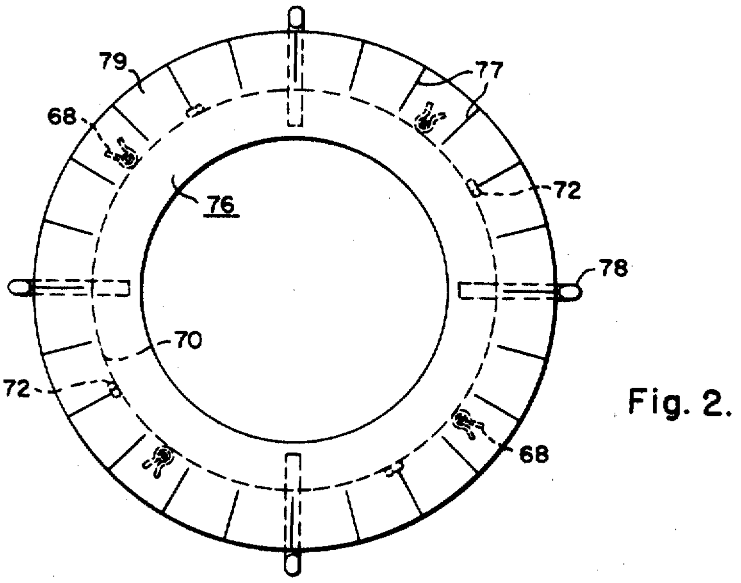
FIG. 2 shows a plan view of the shielding means incorporated in the image dissector shown in FIG. 1.

An umbrella shaped shielding member 76 is inserted within the minor portion 16 between the cathode element 18 and the aperture plate 60 to prevent electrons generated by the photocathode element 18 from being attracted by the high voltage existing within the pickup section 40. As shown in both FIGS. 1 and 2, the shielding member 76 is shaped in an annular configuration and has a peripheral portion 79. The peripheral portion 79 has a plurality of slits 77 radically cut therein, which allows the shielding member 76 to be easily placed within the envelope 12 and to resiliently abut against a G4 electrode 38. The G4 electrode 38 is made of a non-reflective or black layer of a material such as titanium, aluminum or antimony which has been evaporated upon the interior of the minor portion 16 of the envelope 12. The umbrella shaped shielding member 76 may be made of a material well known in the art such as stainless steel. The G4 electrode 38 extends from the shoulder portion 36 to a point beyond the aperture plate 60, as shown in FIG. 1.

The umbrella shaped shielding member 76 is secured as by welding to an annular ring 74. Further, support pins 72 are attached to the annular ring 74 and serve to space the shielding member 76 from a support ring 70. The annularly shaped support ring 70 is in turn mounted upon support rods 66 made of an insulating material such as alumina which are attached to the cup member 58. A cylindrical shielding element 64 is secured to the lower end of the cup member 58 and is positioned about the dynodes to further prevent electrons from being attracted by the high voltages applied to the dynodes. The shielding element 64 may be made of a material well known in the art such as stainless steel and may be secured to the cup member 58 by means well known in the art such as spot welding. The support rods 66 may be mechanically secured by tabs 68 which are in turn welded to the metallic surfaces of their respective elements 70, 58 and 64.

As noted above slits 77 have been provided in the shielding member 76 to allow the shield to be easily inserted within the envelope 12; however, the slits 77 allow a small number of electrons emitted by the photocathode element 18 to pass therethrough. These electrons are further shielded by the shielding element 64 which extends from the cup member 58 and completely surrounds the dynodes as shown in FIG. 1. Theoretically for best results, the umbrella shaped shielding member 78 could be gold plated for better absorption of the electrons; however, it has been found in practice that the gold plating may be eliminated in many applications.

The umbrella shaped shielding member 76 is spaced from the aperture plate 60 as shown in FIG. 1. It has been found that during the evacuation of the envelope 12, that it was necessary to provide a spacing between these elements in order to allow the gas within the major portion 14 to be pumped through the minor portion 16 and through an exhaust valve 55 in the end plate 54. In one particular embodiment, the umbrella shaped shielding member 76 was mounted approximately one-half inch above the support ring 70 to allow for sufficient flow of gases around the shielding member 76 during evacuation.

Electrical connections may be made through pins 52 to the G3 electrode 56 and the G4 electrode 38 by connecting wires 50 which have been inserted through the hollow portions of the spaghetti like support rods 66. More specifically, the electrical connection to the G4 electrode 38 is made by the connecting wire 50 through the electrically conductive support ring 70 to a resilient bulb spacer 78 which has been secured as by welding to the support ring 70. The other end of the bulb spacer 78 is resiliently held against the metallic layer forming the G4 electrode 38. Although the peripheral portion 79 of the shielding member 76 do resiliently contact the G4 electrode 38, an additional electrical contact is provided by the bulb spacer 78 through the electrically conductive support ring 70 and support pins 72.

Figure 3:
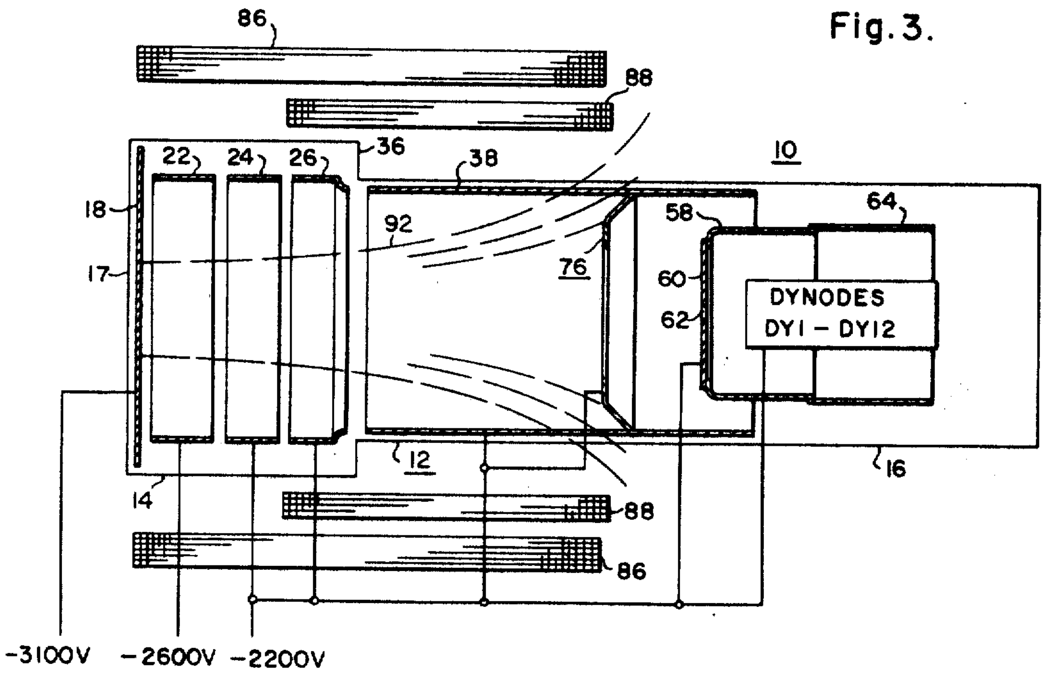
FIG. 3 shows a diagrammatic view of the image dissector shown in FIG. 1.

Referring now to FIG. 3, a diagrammatic view of the image dissector 10 is presented. As similarly depicted in FIG. 1, the photocathode element 18 is shown with a plurality of electrodes—i.e. the G6 electrode 22, the target cup electrode 24, the G5 electrode 26 and the G4 electrode 38—axially aligned of each other and disposed about the pathway of the electron image emitted by the photocathode element 18. The aperture plate or surface 60 is disposed at the opposite end of the image dissector 10 from the photocathode element 18. A set of deflection coils 88 are disposed about the envelope 12 to scan the electron image emitted by the photocathode element 18 across the collecting aperture 62. Further, a magnetic focusing coil 86 is disposed about the envelope 12; the position of the coil 86 can be adjusted to focus and to vary the size of the electron image as it falls upon the plane of the aperture plate 60. The dynodes DY1 to DY12 are diagrammatically depicted as being aligned behind the collecting aperture 62 to provide a multiplication of the electrons penetrating the collecting aperture 62. As fully disclosed in the above-referred to copending application, Ser. No. 383,316, each of the dynodes DY1 to DY12 is set at a specified voltage which is incrementally changed by a constant value from the voltage applied to the proceeding dynode. In a typical operation, a voltage of approximately −2200 volts is applied across the dynodes DY1 to DY12 to provide a voltage difference between each of the dynodes of approximately 180 volts.

In operation, the illustrative embodiment of the image dissector 10 presented herein functions in the following manner. A light image is focused upon the photocathode element 18 which in turn emits a flow of electrons corresponding to the light image. The flow of electrons of electron image is accelerated by the successively positive voltages applied to the G6 electrode 22, and the target cup electrode 24, the G4 electrode 28 and the G3 electrodes 38. A magnetic field created by the focusing coils 86 cause the accelerating electron image to be focused upon the aperture plate 60. As fully disclosed in the above referred to copending application, Ser. No. 383,316, the magnetic focusing coils 86 also cause the size of the electron image to be varied or diverged as it is focused in the plane of the aperture plate 60 to thereby effect an apparent change in the size of the collecting aperture 62. The electron image is scanned across the receiving aperture 62 of the aperture plate by the set of deflection coils 88. That portion of the electron image falling upon the collecting aperture 62 will be directed onto the first dynode DY1. This portion of the electron image is then successively multiplied as the electrons are directed from dynode to dynode by the incrementally, more positive voltages applied to each dynode to thereby provide a strengthened output signal corresponding to the light image focused upon the photocathode element 18. In a typical mode of operation, a negative voltage of approximately 3100 volts may be applied to the photocathode element 18, whereas successively more positive potentials of −2600 volts and −2200 volts may be applied to the G6 electrode 22, and the target cup electrode 24, the G5 electrode 26, and the G4 electrode 38 (which are electrically interconnected at the same potential) to accelerate the electron image toward the aperture plate 60.

One of the principal features of this invention lies in the shielding means provided between the photocathode element 18 and the aperture plate 60 to prevent spurious electrons attracted by the voltage developed in the dynode section from causing noise or extraneous signals. As shown in FIGS. 1 and 3, an annular shaped shielding member 76 is disposed between the photocathode element 18 and the aperture plate 60 to substantially intersect that portion of the electron image as indicated by the numeral 92 which is not directed through the collecting aperture 62. Further, additional means including the cup member 58 and the cylindrical shielding element 64 are disposed about the dynodes DY1 to DY12 to prevent diverging electrons from being attracted to the dynode elements, the dynode anode, and their associated connecting wires 50. As mentioned above, the umbrella shaped shielding member 76 is connected at the same potential as the G4 electrode 38, which is sufficiently positive to collect nearly all of those electrons not directed to the collecting aperture 62. Further, as noted in the copending application, Ser. No. 383,316, it is desired to vary the size of the electron image as indicated at numeral 92 in order to vary the apparent size of the collecting aperture 62. Thus, it may be seen that there is an additional tendency when the electron image is magnified for the electron image to be directed about the aperture plate 60 and to produce the undesired noise. Therefore, the umbrella shaped shielding means 76 has a particular application, though it is not limited thereto, to such a high resolution, image dissector as disclosed in the above referred to copending application.

While there has been shown and described what are presently considered to be the preferred embodiments of this invention, modifications thereto will readily occur to those skilled in the art. For example, the shielding means described herein may be easily adapted to the electrostatic embodiment disclosed in the above referred to copending application. Therefore, it is not desired that the invention be limited to the specific arrangement shown and described and it is intended to cover in the appended claims all such modifications as fall within the true spirit and scope of the invention.

What is claimed is:

1. An image dissector comprising an evacuated envelope, a photocathode element for transforming light into an electron image, an electron multiplier disposed within said envelope at a point remote from said photocathode element, an aperture plate disposed between said photocathode element and said electron multiplier and having an aperture therein which is aligned with said electron multiplier, focusing means to vary the size of said electron image disposed between said photocathode element and said aperture plate, and a shield disposed between said aperture plate and the inner periphery of said envelope to substantially prevent electrons from being drawn about said aperture plate and into said electron multiplier.

2. An image dissector comprising an evacuated envelope, a photocathode element for transforming light into a flow of electrons, an electron multiplier disposed within said envelope at a point remote from said photocathode element, an aperture plate disposed between said photocathode element and said electron multiplier and having an aperture therein which is aligned with said electron multiplier, an accelerating electrode disposed about said flow electrons, and a shielding means disposed between said photocathode element and said aperture plate to substantially prevent electrons from being drawn about said aperture plate and into said electron multiplier, shielding means having a portion abutting said accelerating electrode.

3. An image dissector comprising an evacuated envelope, a photocathode element disposed within said envelope for transforming light into a flow of electrons, an electron multplier disposed within said envelope at a point remote from said photocathode element, an aperture plate disposed between said photocathode element and said electron multiplier and having an aperture therein which is aligned with said electron multiplier, and a shielding member disposed between said photocathode element and said aperture plate and about said flow of electrons, said shielding member having a resilient, peripheral portion to abut the interior surface of said envelope.

4. An image dissector comprising a photocathode element for transforming light into a flow of electrons, an electron multiplier, an aperture plate disposed between said photocathode element and said electron multiplier and having an aperture therein which is aligned with said electron multiplier, a first shielding member disposed between said photocathode element and said aperture plate to substantially prevent electrons from being drawn about said aperture plate and into said electron multiplier, and a second shielding member disposed about said electron multiplier.

5. An image dissector comprising an evacuated envelope, a photocathode element disposed within said envelope, an electron multiplier disposed within said envelope at a point remote from said photocathode element, an aperture plate disposed between said photocathode element and said electron multiplier and having an aperture therein which is aligned with said electron multiplier, and an annular shaped shielding member disposed between said photocathode element and said aperture plate, said shielding member having radial disposed slots in the outer periphery of said shielding member to form a resilient portion which abuts against the inner surface of said envelope.

6. An image dissector system comprising an evacuated envelope having a light transmissive surface on which is formed a photocathode element, said photocathode element transforming a light image into an electron image, an electron multiplier positioned within said envelope at a point remote from said photocathode element and including a plurality of secondary emissive dynodes, an aperture plate disposed between said photocathode element and said electron multiplier and having an aperture therein aligned with said electron multiplier, a set of coils disposed about said envelope for scanning said electron image across said aperture, at least two tubular electrodes disposed about said flow of electrodes and between said photocathode element and said electron multiplier, means for applying a voltage difference to said electrodes to accelerate said electron image toward said aperture plate, and an umbrella shaped, annular shielding member disposed between said aperture palte and said photocathode element to abut the interior surface of said envelope to prevent electrons being attracted to the said dynodes by the positive voltages applied thereto.

7. An image dissector comprising an evacuated envelope, a photocathode element disposed within said envelope for transforming a light image into an electron image corresponding to said light image, an electron multiplier disposed within said envelope at a point remote from said photocathode element, an aperture plate disposed between said photocathode element and said electron multiplier and having an aperture therein which is aligned with said electron multiplier, an accelerating electrode disposed along the inner surface of said envelope between said photocathode element and said aperture plate, a first electron shielding member of an annular configuration and having a resilient peripheral portion which abuts said accelerating electrode, and a second electron shielding member of a tubular configuration disposed about said electron multiplier.

8. A television camera device comprising means for converting a radiation image into a corresponding electron image, a member having an aperture therein, an electron multiplier disposed remotely with respect to said means to receive electrons directed through said aperture, and shielding means disposed to substantially prevent electrons from being directed onto said electron multiplier except those electrons which are directed through said aperture.

9. An image dissector comprising a photocathode element for converting a radiation image to a corresponding electron image, an electron multiplier, a member disposed between said photocathode element and said electron multiplier and having an aperture therein, and shielding means disposed to substantially prevent spurious electrons from being drawn about said member and into said electron multiplier.

10. An image dissector comprising an envelope in which there is disposed a photocathode element for converting a radiation image into a corresponding electron image, an electron multiplier, a member disposed between said photocathode element and said electron multiplier and having an aperture therein, said member being disposed within said envelope so as to provide a space between said member and said envelope, and shielding means disposed to substantially prevent the passage of electrons through said space and to substantially confine the electrons received by said electron multiplier to those passing through said aperture.

References Cited

UNITED STATES PATENTS

| | | | |
|---|---|---|---|
| 2,836,755 | 5/1958 | Sommer | 315—11 X |
| 3,002,124 | 9/1961 | Schneeberger | 313—103 X |
| 3,329,856 | 7/1967 | Foote | 315—11 |
| 3,353,056 | 11/1967 | Hershyn | 315—31 XR |

RODNEY D. BENNETT, *Primary Examiner.*

JEFFREY P. MORRIS, *Assistant Examiner.*